Patented Apr. 12, 1949

2,467,340

UNITED STATES PATENT OFFICE 2,467,340

VINYL ESTER COMPOSITIONS CONTAINING COLLOIDAL SILICA

Raymond B. Seymour, Dayton, Ohio, assignor to Monsanto Chemical Company, St. Louis, Mo., a corporation of Delaware No Drawing. Application November 17, 1944, Serial No. 563,992

2 Claims. (Cl. 260—41)

The present invention relates to improved polyvinyl resins and more particularly to polyvinyl acetate, polyvinyl chloride or vinyl chloride-vinyl acetate interpolymer containing silica in colloidal form and to a process for producing the same. This invention also provides liquid or resinous vinyl ester organosols containing colloidal silica.

The use of non-colloidal silica as a filler for vinyl resins is well known. For example, in the Stose Patent No. 2,116,986 diatomaceous earth, which is practically pure silica, is employed as a filler in the manufacture of phonograph records from vinyl resins. Crushed quartz has been suggested for the same purpose in the preparation of molded electrical insulating agents from polystyrene in the Berberich Patent No. 2,333,513. Silica gel has been suggested for use as filter with polymerized ethyl acrylate in the Nowak and Hofmeier Patent No. 2,209,928. In such previous applications the siliceous material was merely employed in mechanical admixture with the vinyl resin, the resin serving as a bonding material for the silica particles. That no permanent combination between the silica and the resin was formed may be shown, for example, by the fact that the siliceous filler and the vinyl compound could be separated from each other by adding the filled, molded resin to a material which was a solvent for the resin, whereupon the resin dissolved to give a solution of the resin in presence of undissolved silica particles. There was no permanent combination or dispersion of the silica particles in the vinyl resin, because the silica and the resin could be separated from each other by leaching the silica filled resin with a solvent. It is possible thereby to separate the silica from the resin and to recover both components in unchanged form by removal of the solvent.

The combinations herein disclosed, on the other hand, are not separable by leaching with a solvent. As a matter of fact, as will be pointed out below, dispersions of colloidal silica in polyvinyl acetate or vinyl acetate-vinyl chloride interpolymer can be obtained which are totally insoluble in the usual solvents for polyvinyl acetate or the vinyl acetate-vinyl chloride interpolymers. However, in those combinations of polyvinyl esters and silica where the silica is present in quantity less than that which will produce insolubility, no separation of silica and polyvinyl ester takes place when the resins are dissolved in suitable solvents. Indeed, the solvent may be evaporated and the silica-containing resin recovered in the same form in which it existed prior to solution.

Accordingly, previously known mechanical admixtures of vinyl resins and non-colloidal siliceous materials could not be employed to obtain homogeneous, smooth, cast films; for in casting the mixtures from solutions the silica separated out to give heterogeneous, brittle films that were characterized by a rough surface and a lack of clarity. Molded pieces prepared from mechanical admixtures of a vinyl resin and silica likewise lacked homogeneity. Hence, in spite of the known favorable heat-resisting and electrical insulating properties of silica, the prior art did not know how to incorporate it into a resinous material without incurring thereby a loss of clarity, flexibility and smoothness in the resulting products.

In the prior art products, there was no true combination of the ingredients, each member of the aggregation retaining its own properties. In the case of the present products, the silica, while not losing its colloidal character, imparts valuable properties to the vinyl ester resin itself, as will be pointed out in detail below.

I have found that when I combine a vinyl ester either in the monomeric or polymeric form with a colloidal siliceous material which is in sol form, I am able to prepare a silica-containing liquid organosol or resinous sol which may be cast into flexible, transparent, homogeneous films or molded under heat and pressure to yield substantially clear, transparent molded pieces of good mechanical properties and very high resistance to heat and solvents. I may use an aquasol or an alcohol sol of silica, for example, the aquasol disclosed in the Marshall Patent No. 2,285,449 or a silica sol in a monohydric lower aliphatic alcohol, i. e., an alcohol of from 1 to 5 carbon atoms or the aqua organosols of the Marshall Patents Nos. 2,356,773 and 2,356,774. I may also employ silica sols made by the method disclosed in Patent No. 2,244,325 and in the Neudlinger Patent No. 1,835,420.

For the purpose of the present invention, vinyl esters are considered to include vinyl acetate and vinyl chloride and mixtures and interpolymers thereof in all proportions.

The silica sols employed herein are composed of colloidal particles of $SiO_2$ having a size ranging downwardly from about 600 Å units. When prepared by the process disclosed in the Marshall Patent No. 2,285,449, referred to above, the colloidal particles are generally needle-like in structure, the diameter thereof being in the neighborhood of 35 Å units. Larger colloidal particles may be formed from the needle-like particles by a lengthening of the chain of molecules comprising the particle. The larger particles, in the 600 Å range, are probably composed of closely knit bundles of the fibrous or needle-like variety.

The silica sol may be incorporated into the resin in various ways. I may add the sol to the monomeric vinyl ester or a mixture of the same and then polymerize the resulting organosol by any of the known polymerizing procedures, i. e., by polymerization in mass, in emulsion, in suspension, or in solution. Polymerization may be carried out in the presence or absence of catalysts of polymerization. Or, if desired, the mixture of monomer and aquasol or alcohol sol may be polymerized directly, in which case the water or alcohol is removed from the polymerization product during or subsequent to the polymerizing step. The silica sol may be added to the polymeric vinyl ester or an interpolymer containing the vinyl ester and another vinyl compound copolymerizable therewith. This may be effected by dissolving the polymeric material, adding the sol to the resulting solution and then removing the alcohol and, if desired, the solvent, by distillation. When employing this procedure, for many purposes removal of the solvent and the sol medium is unnecessary. For example, solutions which may be cast into films or used as coatings are obtained by dissolving a polymeric vinyl ester in a solvent, for example, dioxane, and adding an isopropanol silica sol to the solution or adding an aquasol to an emulsion of the polymer or copolymer.

When operating by any of the procedures described above, employing from, say, 2% to 70% by weigh of colloidal silica (calculated as $SiO_2$) of the total weight of the vinyl ester and silica, there are obtained homogeneous silica-containing materials which may be cast or molded to give clear, colorless objects or films of very good mechanical properties and high heat resistance.

Especially interesting results are obtained by combining plasticized vinyl ester resins with the silica sols. When the polymeric vinyl esters are plasticized with such plasticizers as dibutyl phthalate, tricresyl phosphate, etc., there are obtained films which though flexible, are undesirable for certain purposes because of their tackiness. While this property is of value when the material is to be used as an adhesive, when the plasticized polymeric vinyl esters are to be used in coatings or in the manufacture of films, the tackiness is a distinct drawback. I have found, however, that when a silica sol, for example, a silica aquasol, is added to an emulsion of a polymeric vinyl ester or an interpolymer thereof containing one or more of the known plasticizers, films cast from the emulsion are clear, non-tacky, tough and elastic. Attempts to incorporate ordinary silica with polymeric vinyl acetate, vinyl chloride or vinyl acetate-vinyl chloride interpolymer by dispersing the silica in a ball mill with water and emulsifier and adding this to the emulsion of polymer have resulted in opaque brittle resins. Evidently, the colloidal structure of the silica sol is the instrumental factor in the production of clear, flexible, siliceous polymeric vinyl esters, for I have found that when even comparatively large amounts of the silica sol are added to the emulsion of polymer, in presence or absence of a plasticizing agent, the resulting films are substantially as clear as those prepared from the polymers or interpolymers in absence of silica.

There is a gradual graduation of properties in the polymeric vinyl ester films, which depends upon the quantity of silica sol employed. I have found the optimum quantity of the sol, calculated as $SiO_2$, to be from, say, 5% to 30% by weight of the combined vinyl ester and silica. When the quantity of silica exceeds, say, 40%, the polyvinyl ester films are slightly brittle, although plasticizers may be employed to minimize this drawback. When the quantity of silica is equal to that of the polymeric vinyl ester, the resulting films are opaque, though continuous. On the other hand, films containing from, say, 6% 25% of the silica sol are stronger, have high softening points, and are less tacky than pla ticized or unplasticized polyvinyl ester film formed in the absence of silica sol. The hea resisting properties of the silica sol-containir films are thereby materially increased, as wi be hereinafter disclosed.

While polymeric vinyl ester films containin more than 30% of the colloidal silica are som what brittle, such films are of interest as coatin materials for various purposes in the electric arts, where they may be applied to supportin surfaces. With colloidal silica contents as hig as 80% to 90% by weight, the balance being polymerized vinyl ester such as polyvinyl aceta or polyvinyl chloride or vinyl acetate-vinyl chl ride copolymer, the combination can be produce by casting in the form of extremely thin, cor tinuous films.

The present invention is further illustrate but not limited, by the following examples:

*Example 1*

Various proportions of an isopropanol silic sol (containing 20% of $SiO_2$) were added to solution which had been prepared by dissolvin polyvinyl acetate in hot ethanol. Films whic where cast from the resulting solutions were con tinuous and had the following properties:

| Polymer | $SiO_2$ | Nature of Film |
|---|---|---|
| *Grams* | *Grams* | |
| 100 | 0.0 | Clear. |
| 100 | 10.0 | Do. |
| 100 | 30.0 | Hazy. |
| 100 | 50.0 | Translucent. |
| 100 | 100.0 | Opaque. |

Portions of the solutions were precipitated b pouring into water, the precipitate was dried an thermal data were determined on the coppe Maquenne bar. The following values were ob tained:

| Polymer | $SiO_2$ | Softening Point | Melting Point |
|---|---|---|---|
| *Grams* | *Grams* | °C. | °C. |
| 100 | 0.0 | 107 | 290+ |
| 100 | 10.0 | 121 | 290+ |
| 100 | 30.0 | 136 | 290+ |
| 100 | 50.0 | 156 | 290+ |
| 100 | 100.0 | 290+ | 290+ |

The dried precipitates were also submitted t a hot molding process. Test specimens so ob tained are characterized as follows:

| Polymer | $SiO_2$ | Nature of Molding |
|---|---|---|
| *Grams* | *Grams* | |
| 100 | 0.0 | Clear. |
| 100 | 10.0 | Do. |
| 100 | 30.0 | Hazy. |
| 100 | 50.0 | Not moldable. |
| 100 | 100.0 | Do. |

In precipitating the mixture of silica sol an ethanol solution of polyvinyl acetate by pourin into water, there was observed no separation o silica, and there was no evidence of silica in th filtrate. This shows that the silica sol is com bined with the polymer in such a manner tha the union is not disrupted during solution an precipitation processes and indicates a highl stable structure which is something more than mere physical combination.

Example 2

Various proportions of an isopropanol silica sol (containing 20% of $SiO_2$) were added to a 10% solution of vinyl acetate-vinyl chloride copolymer (13:87) in acetone. Films which were cast from the resulting solutions were continuous and had the following properties:

| Copolymer | $SiO_2$ | Nature of Film |
|---|---|---|
| Grams | Grams | |
| 100 | 0.0 | Clear. |
| 100 | 10.0 | Do. |
| 100 | 30.0 | Hazy. |
| 100 | 50.0 | Translucent. |
| 100 | 100.0 | Opaque. |

Portions of the solutions were drum-dried, and thermal data on the dried products were determined in the copper Maquenne bar. The following values were obtained:

| Copolymer | $SiO_2$ | Softening Point |
|---|---|---|
| Grams | Grams | °C. |
| 100 | 0.0 | 103 |
| 100 | 10.0 | 115 |
| 100 | 30.0 | 131 |
| 100 | 50.0 | 175 |
| 100 | 100.0 | 185 |
| 100 | 200.0 | 191 |

It is obvious that the respective proportions of vinyl acetate and vinyl chloride may be varied over a wide range.

Example 3

A mixture consisting of 100 g. of vinyl chloride, 100 g. of tricresyl phosphate, 0.2 g. of potassium persulfate, 300 g. of water and 9 g. of Santomerse (a higher alkyl benzene sulfonate) was agitated for 16 hours at a temperature of 35° C. A silica aquasol (11% $SiO_2$) was added to the resulting emulsion and films were cast from the mixture. Films having as much as 30 parts by weight of $SiO_2$ were clear and flexible and exhibited less cold flow than films made in the absence of the silica sol.

Example 4

A mixture consisting of 87 g. of vinyl chloride, 13 g. of vinyl acetate, 30 g. of tricresyl phosphate, 6 g. of Santomerse (a higher alkyl benzene sulfonate) and 200 g. of water was agitated for 24 hours at a temperature of from 35° C. to 40° C. 250 g. of a silica aqua sol (containing 11% of $SiO_2$) was added to the resulting emulsion and the mixture was thoroughly homogenized by stirring. Films cast from this mixture were transparent, flexible and highly heat-resistant.

Example 5

A mixture consisting of 100 g. of vinyl chloride, 100 g. of tricresyl phosphate, 100 g. of silica aquasol (containing 11% $SiO_2$), 0.2 g. of potassium persulfate, 300 g. of water and 9 g. of Santomerse (a higher alkyl benzene sulfonate) was agitated for 16 hours at a temperature of 35° C. Films cast from the resulting emulsion were clear and flexible and exhibited less cold flow than films made in the absence of the silica sol.

Because of the excellent thermal and physical properties of polyvinyl ester resins containing silica sol they are valuable for the production of molded, cast or extruded parts for the following purposes:

Electrical insulation, particularly ignition and lighting fixtures for automotive and aeronautical purposes, also switches, sockets, lamp housings, commutators, housings for vacuum cleaners, electrical shavers, refrigerator parts, can coating lacquers, hair-dryers, rectifiers, transformers, steering wheels, decorative parts, knobs and handles, radio parts such as molded cases, plugs, adapters, chemical tank lining materials, photographic films, surgical instruments (which may be sterilized without distortion), etc. For certain purposes the present materials may be drawn or extruded into threads or fibers. As hereinbefore described, the present silica sol-containing polyvinyl esters are particularly valuable in the production of coating materials and cast films. Their high heat-resistance and flexibility recommends them for use as wire coatings. Because of their ability to control the stickiness which is often developed when polymeric vinyl esters are incorporated with plasticizers, the silica sols are very advantageously employed with this combination. As plasticizers may be used any non-volatile material which is known to be compatible with vinyl ester resins and to have a plasticizing effect when incorporated therein.

A variety of methods may be utilized in applying the principle of my invention and the products produced thereby, the invention being limited only by the appended claims.

What I claim is:

1. The process which comprises mixing together an isopropanol silica sol with a solution of polyvinyl chloride, drying the resulting mixture and recovering a polyvinyl chloride product containing from 2% to 70% by weight of silica, the balance of said product being polyvinyl chloride, the amount of isopropanol silica sol employed in forming said mixture being sufficient to supply to the said product the said 2% to 70% by weight of silica, the silica in said product being inseparable upon solution of said product in a solvent for said polyvinyl chloride.

2. The process which comprises mixing together an isopropanol silica sol with a solution of polyvinyl chloride, drying the resulting mixtures and recovering a polyvinyl chloride product containing from 5% to 30% by weight of silica, the balance of said product being polyvinyl chloride, the amount of isopropanol silica sol employed in forming the said mixture being sufficient to supply to the said product the said 5% to 30% by weight of silica, the silica in said product being inseparable upon solution of said product in a solvent for said polyvinyl chloride.

RAYMOND B. SEYMOUR.

REFERENCES CITED

The following references are of record in the file of this patent:

UNITED STATES PATENTS

| Number | Name | Date |
|---|---|---|
| 1,946,597 | Symonds | Feb. 13, 1934 |
| 2,116,986 | Stose | May 10, 1938 |
| 2,285,477 | White | June 9, 1942 |
| 2,311,233 | Jaenicke | Feb. 16, 1943 |
| 2,408,656 | Kirk | Oct. 1, 1946 |